United States Patent
Darde et al.

(10) Patent No.: US 9,895,653 B2
(45) Date of Patent: Feb. 20, 2018

(54) PROCESS AND APPARATUS FOR THE SEPARATION OF A STREAM CONTAINING CARBON DIOXIDE, WATER AND AT LEAST ONE LIGHT IMPURITY INCLUDING A SEPARATION STEP AT SUBAMBIENT TEMPERATURE

(71) Applicant: L'Air Liquide, Société Anonyme pour l'Etude et l'Exploitation des Procédés Georges Claude, Paris (FR)

(72) Inventors: Arthur Darde, Paris (FR); Richard Dubettier-Grenier, La Varenne Saint Hilaire (FR); David J. Hasse, Middletown, DE (US); Sudhir S. Kulkarni, Wilmington, DE (US); Mathieu LeClerc, Paris (FR); Paul Terrien, Paris (FR)

(73) Assignee: L'AIR LIQUIDE SOCIETE ANONYME POUR L'ETUDE ET L'EXPLOITATION DES PROCEDES GEORGES CLAUDE, Paris (FR)

( * ) Notice: Subject to any disclaimer, the term of this patent is extended or adjusted under 35 U.S.C. 154(b) by 424 days.

(21) Appl. No.: 14/413,664

(22) PCT Filed: Jul. 11, 2013

(86) PCT No.: PCT/EP2013/064644
§ 371 (c)(1),
(2) Date: Jan. 8, 2015

(87) PCT Pub. No.: WO2014/009449
PCT Pub. Date: Jan. 16, 2014

(65) Prior Publication Data
US 2015/0174523 A1    Jun. 25, 2015

(30) Foreign Application Priority Data

Jul. 13, 2012   (EP) .................................. 12305846

(51) Int. Cl.
*B01D 53/00* (2006.01)
*B01D 53/22* (2006.01)
(Continued)

(52) U.S. Cl.
CPC ......... *B01D 53/229* (2013.01); *B01D 53/002* (2013.01); *B01D 53/22* (2013.01);
(Continued)

(58) Field of Classification Search
CPC ........ B01D 2256/22; B01D 2258/0283; B01D 2259/40001; B01D 2259/40086;
(Continued)

(56) References Cited

U.S. PATENT DOCUMENTS 5,414,190 A * 5/1995 Forg ........................ C07C 7/005
585/802
5,647,227 A    7/1997 Lokhandwala
(Continued)

FOREIGN PATENT DOCUMENTS

EP    0 596 470    5/1994
EP    2 404 656    1/2012
(Continued)

OTHER PUBLICATIONS

International Search Report and Written Opinion for PCT/EP2013/064644, dated Dec. 9, 2013.

*Primary Examiner* — Cabrena Holecek
(74) *Attorney, Agent, or Firm* — Justin K. Murray

(57) ABSTRACT

In a process for the separation of a stream containing carbon dioxide, water and at least one light impurity including a separation step at subambient temperature, the feed stream
(Continued)

is compressed in a compressor comprising at least two stages to form a compressed feed stream, the compressed feed stream is purified in an adsorption unit to remove water and form a dried compressed stream, the dried compressed stream or a stream derived therefrom is cooled to a subambient temperature and separated by partial condensation and/or distillation in a separation apparatus, liquid enriched in carbon dioxide is removed from the separation apparatus, the adsorption unit is regenerated using a regeneration gas and the regeneration gas is formed by separating, by permeation in a permeation unit, the dried compressed stream or a gas derived therefrom, the permeate of the permeation unit constituting the regeneration gas.

18 Claims, 3 Drawing Sheets

(51) Int. Cl.
  *B01D 53/26* (2006.01)
  *F28C 3/08* (2006.01)
  *F25J 3/06* (2006.01)
  *F25J 3/02* (2006.01)
  *F23J 15/04* (2006.01)

(52) U.S. Cl.
  CPC ............ *B01D 53/261* (2013.01); *F23J 15/04* (2013.01); *F25J 3/0223* (2013.01); *F25J 3/0266* (2013.01); *F25J 3/067* (2013.01); *F25J 3/0625* (2013.01); *F28C 3/08* (2013.01); *B01D 2256/22* (2013.01); *B01D 2258/0283* (2013.01); *B01D 2259/40001* (2013.01); *B01D 2259/40086* (2013.01); *F23J 2215/50* (2013.01); *F23J 2219/40* (2013.01); *F25J 2200/02* (2013.01); *F25J 2200/40* (2013.01); *F25J 2200/70* (2013.01); *F25J 2205/04* (2013.01); *F25J 2205/40* (2013.01); *F25J 2205/66* (2013.01); *F25J 2205/70* (2013.01); *F25J 2205/80* (2013.01); *F25J 2210/04* (2013.01); *F25J 2210/70* (2013.01); *F25J 2220/80* (2013.01); *F25J 2220/82* (2013.01); *F25J 2230/30* (2013.01); *Y02C 10/12* (2013.01)

(58) Field of Classification Search
  CPC .... B01D 53/002; B01D 53/22; B01D 53/229; B01D 53/261; F23J 15/04; F23J 2215/50; F23J 2219/40; F23J 2200/02; F23J 2200/40; F23J 2200/70; F23J 2205/04; F25J 2205/40; F25J 2205/66; F25J 2205/70; F25J 2205/80; F25J 2210/04; F25J 2210/70; F25J 2220/80; F25J 2220/82; F25J 2230/30; F25J 3/0223; F25J 3/0266; F25J 3/0625; F25J 3/067; F28C 3/08; Y02C 10/12
  See application file for complete search history.

(56) References Cited

U.S. PATENT DOCUMENTS

2004/0168570 A1* 9/2004 Franek ................... B01D 53/22
  95/50
2012/0111051 A1* 5/2012 Kulkarni .............. B01D 53/229
  62/619

FOREIGN PATENT DOCUMENTS

WO  WO 2007 126972  11/2007
WO  WO 2012 048078  4/2012

* cited by examiner

PROCESS AND APPARATUS FOR THE SEPARATION OF A STREAM CONTAINING CARBON DIOXIDE, WATER AND AT LEAST ONE LIGHT IMPURITY INCLUDING A SEPARATION STEP AT SUBAMBIENT TEMPERATURE

CROSS REFERENCE TO RELATED APPLICATIONS

This application is a §371 of International PCT Application PCT/EP2013/064644, filed Jul. 11, 2013, which claims the benefit of EP12305846.3, filed Jul. 13, 2012, both of which are herein incorporated by reference in their entireties.

TECHNICAL FIELD OF THE INVENTION

The present invention relates to a process and an apparatus for the separation of a stream containing carbon dioxide, water and at least one light impurity including a separation step at subambient temperature.

BACKGROUND

Oxycombustion flue gases are generally purified using a separation step at subambient temperature to produce pure $CO_2$. Upstream of the separation step the flue gas is purified by adsorption to remove water. The adsorption unit typically comprises two beds which operate according to a cycle, the cycles being timed so that the flue gas can be purified at all times. It is necessary to regenerate the adsorption unit by sending a dry gas through the bed to eliminate the accumulated humidity.

The dried flue gas is sent from the adsorption unit to the separation unit to be separated by subambient temperature distillation using at least one phase separator and/or a distillation column. Non condensable gases are removed from the separation unit and still contain a significant portion of $CO_2$. $CO_2$ can be recovered from these non-condensable gases via a permeation device, an adsorption device (Pressure Swing Adsorption or Vacuum Pressure Swing Adsorption). The dried flue gas typically contains at least 65% carbon dioxide or even at least 70% carbon dioxide and at least 1% oxygen. A maximum percentage for the carbon dioxide content could be 95%.

It is known from U.S. Pat. No. 8,012,446 to regenerate the adsorption unit with the permeate of a membrane device at low pressure and recycle the permeate to the boiler or the environmental island. This allows for impurities regenerated from the dryer to be efficiently handled in the environmental island or the boiler itself (desulfurization steps and/or combustion in the boiler and/or NOx production mitigation in the boiler).

It is also known from WO-A-2007/126972 to separate the feed in a phase separator and send the liquid formed to a distillation column producing pure carbon dioxide. In this case, the gas from the phase separator is mixed with the column top gas and used to regenerate the adsorption unit. EP-A-0596470 describes a process according to the preamble of Claim 1.

SUMMARY OF THE INVENTION

One advantage of the present invention is that it valorizes the permeate pressure by recycling the permeate into the feed gas compressor at an inter-stage thereof, thus improving the energy efficiency of the system.

Low temperature operation of such a membrane system can greatly improve efficiency, as shown in US-A-20120111051. Because of this advantage, it is possible to maintain high $CO_2$ recovery despite increasing the permeate pressure The drying stage may be placed downstream of the third or the fourth stage of compression. The permeate of the membrane unit is recycled upfront of the dryer.

Several embodiments are possible:

1. CPU (cold purification unit)+ membrane, permeate recycled after dryers regeneration at an inter-stage of the compressor 2. CPU+ two stages of membranes in series, one permeate regenerates the dryers and is recycled in the compressor, the other permeate is sent to the boiler. The permeate which has the highest oxygen concentration would be recycled to the boiler so as to valorize the oxygen and reduce ASU production 3. Membrane+ CPU (on the residue and/or on the permeate after regeneration of dryers+ compression According to an object of the invention, there is provided a process for the separation of a stream containing carbon dioxide, water and at least one light impurity including a separation step at subambient temperature wherein:

i) a feed stream is purified in an adsorption unit to remove water and form a dried stream, ii) the dried stream or a stream derived therefrom is cooled to a subambient temperature and separated by partial condensation and/or distillation in a separation apparatus, iii) liquid enriched in carbon dioxide is removed from the separation apparatus, iv) the adsorption unit is regenerated using a regeneration gas, the regeneration gas is formed by separating by permeation in a permeation unit the dried compressed stream or a gas derived therefrom, the permeate of the permeation unit constituting the regeneration gas.

characterized in that the stream is compressed in a compressor comprising at least two stages to form the feed stream and the feed stream contains at least 65 mol. % carbon dioxide.

According to other optional aspects of the invention:
- the dried compressed stream or a gas derived therefrom is cooled and separated in the phase separator, the gas from the phase separator constituting the gas derived from the further compressed dried stream and being separated in the permeation unit and the non-permeate of the permeation unit being warmed and removed.
- the permeation unit has an entry temperature of between −60° C. and −10° C.
- the non-permeate of the permeation unit is separated in a further permeation unit, the permeate of the further permeation unit being sent upstream of a stage of the compressor.
- the further permeation unit has an entry temperature of between −60° C. and −10° C.
- the dried compressed stream is separated in the permeation unit, the permeate forming the regeneration gas and the non-permeate forming the stream derived from the dried compressed stream of step iii).
- the permeation unit has an entry temperature between ambient temperature and −10° C.
- the liquid enriched in carbon dioxide vaporizes to produce refrigeration to cool the dried compressed stream or the non-permeate derived therefrom.

the regeneration gas is sent from the adsorption unit to the compressor downstream of at least one stage of the compressor.

the permeate of the permeation unit has a lower carbon dioxide purity than the gas which feeds the permeation unit.

the permeate of the permeation unit has a higher purity in the at least one light component than the gas which feeds the permeation unit.

the dried compressed stream is further compressed prior to the permeation step.

the dried compressed stream is further compressed prior to the cooling step.

the at least one light component is chosen from the group comprising hydrogen, oxygen, nitrogen, argon, carbon monoxide, nitrogen oxide.

According to an object of the invention, there is provided an apparatus for the separation of a stream containing carbon dioxide, water and at least one light impurity including a separation apparatus operating at subambient temperature, an adsorption unit for purifying a feed stream to remove water and form a dried stream, a heat exchanger for cooling the dried stream or a stream derived therefrom is cooled to a subambient temperature, a separation apparatus for separating by partial condensation and/or distillation, a conduit for removing liquid enriched in carbon dioxide from the separation apparatus, a conduit for sending regeneration gas to the adsorption unit and a permeation unit for separating the dried compressed stream or a gas derived therefrom and a conduit for removing a permeate of the permeation unit as the regeneration gas characterized in that it comprises a compressor comprising at least two stages for compressing the stream to form the feed stream.

According to other optional aspects of the invention:

a phase separator for separating the cooled dried compressed stream or a gas derived therefrom and a conduit for sending the gas from the phase separator to the permeation unit.

a conduit for sending the non-permeate of the permeation unit to the heat exchanger to be warmed.

the permeation unit is located within an insulated enclosure.

the apparatus comprises further permeation unit, a conduit for sending the non-permeate of the permeation unit to be separated in the further permeation unit and a conduit for sending the permeate of the further permeation unit upstream of a stage of the compressor.

the further permeation unit is located within an insulated enclosure.

the dried compressed stream is separated in the permeation unit, the permeate forming the regeneration gas and the non-permeate being separated in the separation apparatus.

the permeation unit is located outside the insulated enclosure.

the apparatus comprises means for sending the liquid enriched in carbon dioxide to the heat exchanger to be vaporized to produce refrigeration to cool the dried compressed stream or the non-permeate derived therefrom.

a conduit for sending the regeneration gas from the adsorption unit to the compressor downstream of at least one stage of the compressor.

the apparatus comprises a compressor for compressing the dried compressed stream prior to the permeation step and/or prior to the cooling step.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

The invention will be described in greater detail with reference to the figures which illustrate processes according to the invention.

Figure 1:
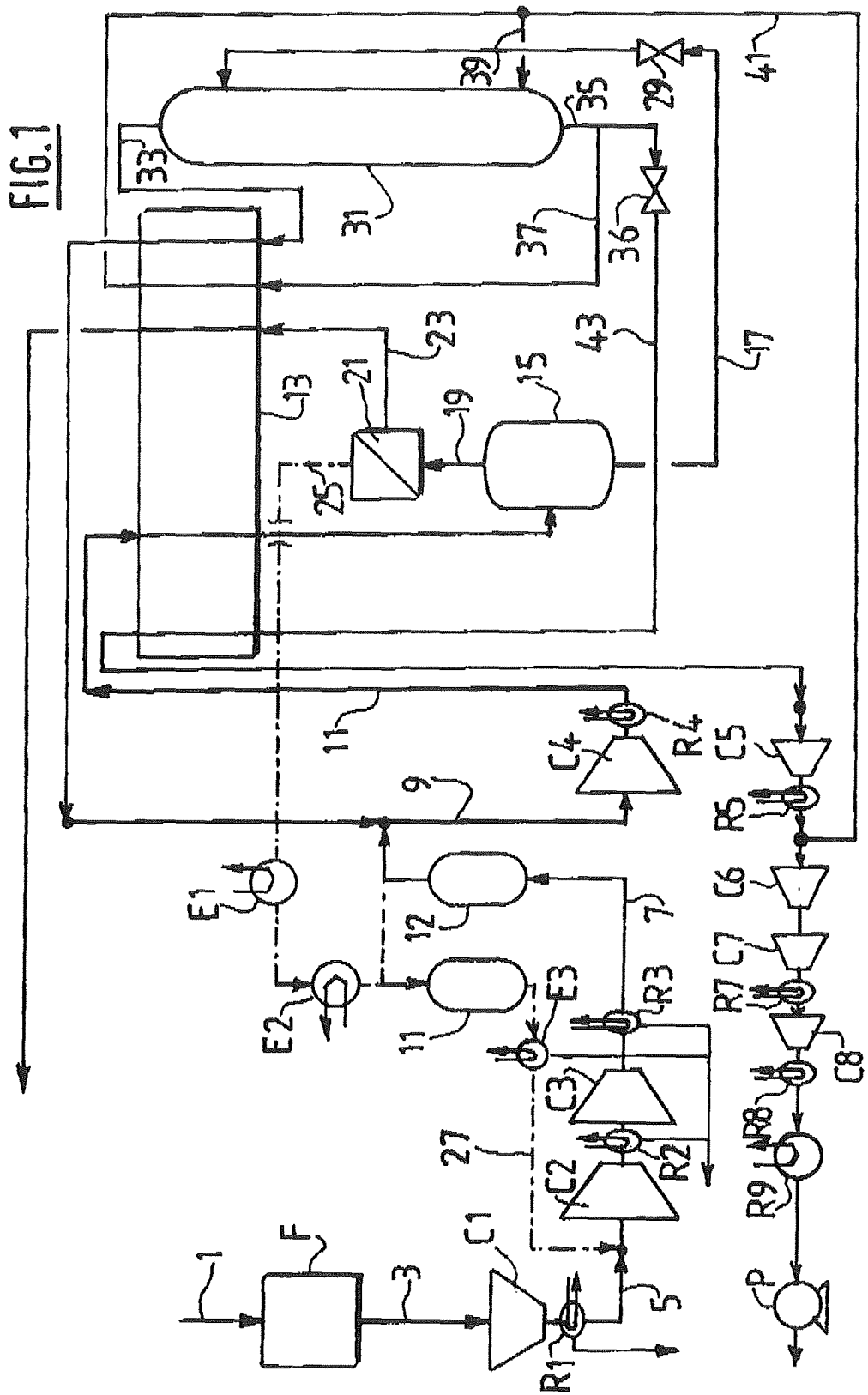
FIG. 1 provides an embodiment of the present invention.

In FIG. 1, a mixture of carbon dioxide, nitrogen and oxygen containing between 65 and 95% mol. carbon dioxide is separated in a filter F to remove particles and then compressed as stream 3 in compressor stage C1 and then cooled in cooler R1 to form stream 5. Stream 5 is further compressed in compressor stage C2, cooled in cooler R2, compressed in compressor stage C3 and cooler in cooler R3 to form stream 7. Stream 7 is purified in adsorber A2 to remove any remaining humidity and then further compressed in compressor stage C4 and cooled in cooler R4. The dried stream 11 cooled in R4 is cooled in heat exchanger 13 which is a brazed plate fin heat exchanger. This causes stream 11 to condense partially and the partially condensed stream is sent from the cold end of the heat exchanger 13 to phase separator 15. The liquid 17 produced in the phase separator 15 is sent to the top of the column 31 after expansion in valve 29. The liquid 17 is then separated to form a carbon dioxide rich liquid at the bottom of the column and a gas 33 enriched in light impurities at the top of the column. The gas 33 is warmed in heat exchanger 13 and recycled downstream of the absorbent beds A1, A2 and upstream of compressor stage C4 as part of the feed stream 9.

The liquid 35 is divided in two. One part 37 is vaporized in the heat exchanger 13. The vaporized liquid is then divided in two, one part 39 being sent to the bottom of the column 31 and the rest 41 being sent to the inlet of a compressor stage C6.

Liquid 43 from the bottom of the column 31 is expanded in valve 36 and vaporized in the heat exchanger 13 at a lower pressure than stream 37 and sent to the inlet of a compressor stage C5, cooled by cooler R5, mixed with stream 41, compressed in compressor stage C6, compressed in compressor stage C7, cooled in cooler R7, compressed in compressor stage C8, cooler in cooler R8 and condensed in cooler R9 before being pressurized in pump P to form a pressurized liquid product stream.

The adsorbent beds A1, A2 are regenerated using gas 25 produced in membrane separator 21. The gas 19 from phase separator 15 is separated in the membrane separator 21, to produce a permeate stream 25 which is not warmed in exchanger 13 but is used to cool a stream in exchanger E1, warmed in exchanger E2 and then sent to adsorbent bed A1, A2, depending which bed is in service. The gas used to regenerate the bed not in service is then sent to exchanger E3 and recycled into the feed stream 5 downstream of compressor stage C1. The non-permeate 23 from membrane separator 21 is warmed and disposed of in the atmosphere.

Figure 2:
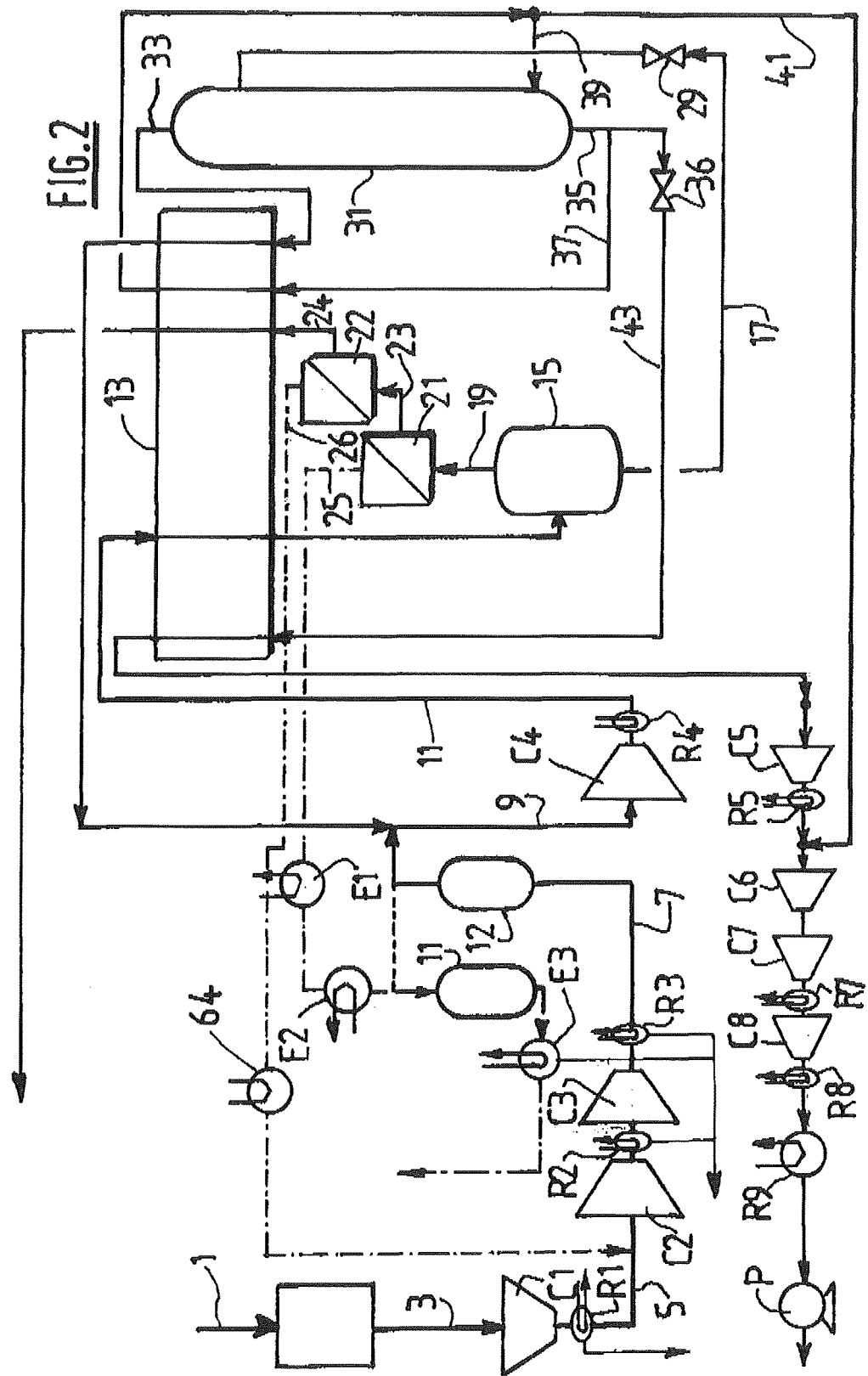
FIG. 2 provides an embodiment of the present invention.

The process of FIG. 2 differs from that of FIG. 1 in that two membrane separators 21, 22 are used in series. Permeate stream 25 at 1.1 bar from membrane 21 is still used to regenerate the adsorbent beds but the non permeate 23 is further separated in further membrane separator 22 to form permeate 26 which is recycled at 2.5 bars downstream of cooler R1. In this case, the regeneration gas is sent to exchanger E3 and then is sent to the boiler from which feed 1 originates.

In these cases, the inlet temperature for the membrane separator 21, 22 varies between −60° C. and −10° C.

In the cases of FIGS. 1 and 2, the heat exchanger, phase separator, membrane unit 21 and the column 31 are located within an insulated enclosure (not shown), to maintain the temperature of operation at a subambient level.

Figure 3:
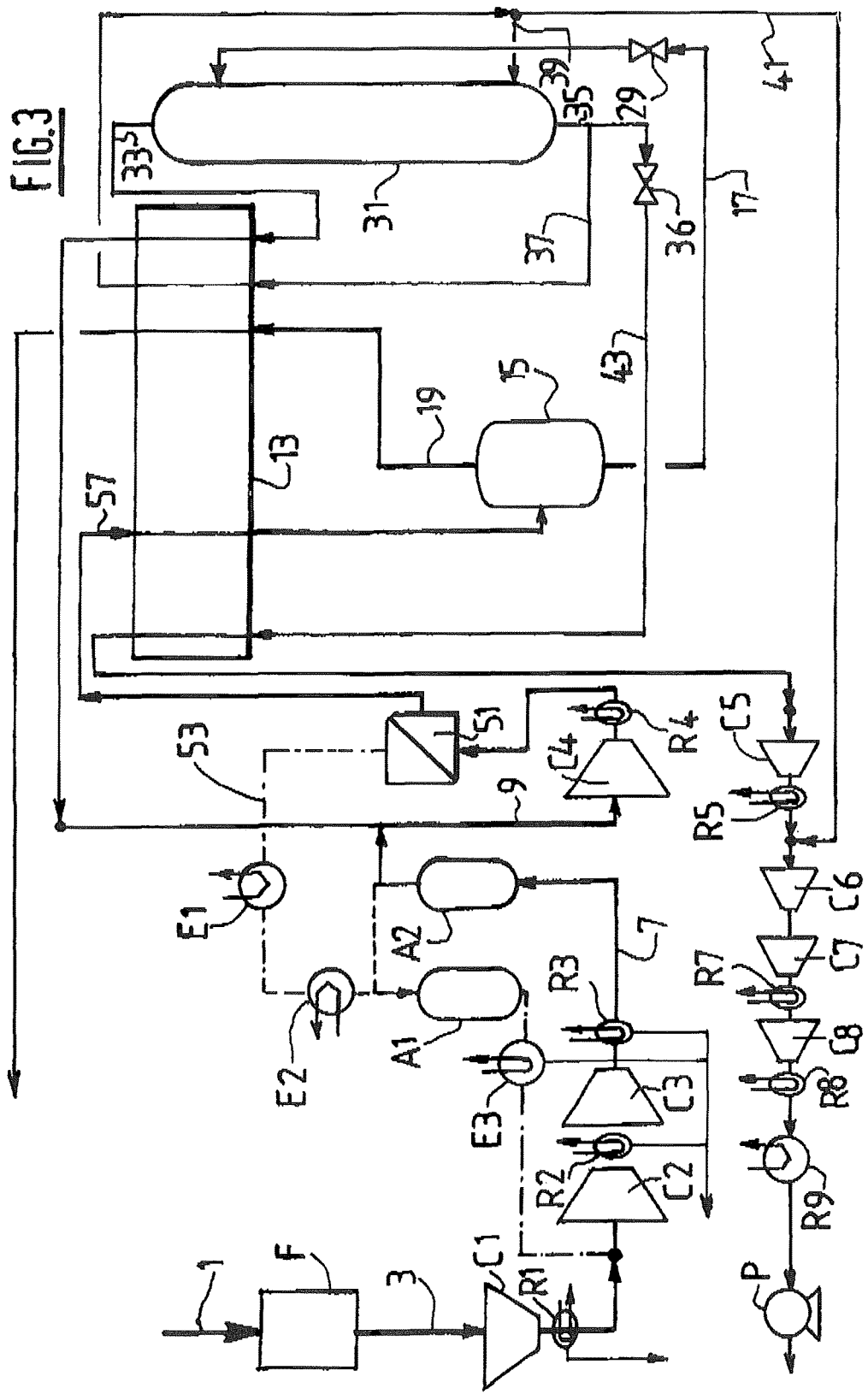
FIG. 3 provides an embodiment of the present invention.

In FIG. 3, the membrane separator is not necessarily a membrane separator operating with such a cold inlet temperature as in FIGS. 1 and 2 but operates with an inlet temperature of −10° C. or above. The feed gas 11 from cooler R4 is separated in the membrane separator 51 to form a permeate 53 which is sent to exchangers E1, E2 and then to the adsorbent bed A1. Once the regeneration gas is removed from the bed, it is sent to exchanger E3 and then recycled into the feed downstream of cooler R1. The non permeate 57 of membrane separator 51 forms the feed gas of the low temperature separation and is cooled in heat exchanger 13 and separated in phase separator 15. The liquid formed 17 is separated as before by distillation and the gas 19 from the phase separator is warmed in the heat exchanger 13 and disposed of in the atmosphere.

In the case of FIG. 3, the heat exchanger, phase separator and the column 31 are located within an insulated enclosure (not shown), to maintain the temperature of operation at a subambient level.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary a range is expressed, it is to be understood that another embodiment is from the one.

Optional or optionally means that the subsequently described event or circumstances may or may not occur. The description includes instances where the event or circumstance occurs and instances where it does not occur.

Ranges may be expressed herein as from about one particular value, and/or to about another particular value. When such particular value and/or to the other particular value, along with all combinations within said range.

All references identified herein are each hereby incorporated by reference into this application in their entireties, as well as for the specific information for which each is cited.

The invention claimed is:

1. A process for the separation of a stream containing carbon dioxide, water and at least one light impurity including a separation step at sub-ambient temperature, the process comprising the steps of:
   i. purifying a feed stream in an adsorption unit to remove water and form a dried compressed stream;
   ii. cooling the dried compressed stream or a stream derived therefrom to a sub-ambient temperature and separating by partial condensation and/or distillation in a separation apparatus;
   iii. removing a liquid enriched in carbon dioxide from the separation apparatus; and
   iv. regenerating the adsorption unit using a regeneration gas;
   v. wherein the regeneration gas is formed by separating, by permeation in a permeation unit, the dried compressed stream or a gas derived therefrom, a permeate of the permeation unit constituting the regeneration gas,
   wherein the stream containing carbon dioxide, water and at least one light impurity is compressed in a compressor comprising at least two stages to form the feed stream and the feed stream contains at least 65 mol. % carbon dioxide,
   wherein the permeate of the permeation unit has a lower carbon dioxide purity then the gas which feeds the permeation unit.

2. The process according to claim 1, wherein the process further comprises the steps of:
   withdrawing a top gas from a phase separator of the separation apparatus and separating the top gas in the permeation unit to form the regeneration gas: and
   withdrawing a retentate from the permeation unit and then warming said retentate.

3. The process according to claim 2, wherein the permeation unit has an entry temperature of between −60° C. and −10° C.

4. The process according to claim 2, further comprising the steps of separating the non-permeate of the permeation unit in a further permeation unit; and sending the permeate of the further permeation unit upstream of a stage of the compressor.

5. The process according to claim 4, wherein the further permeation unit has an entry temperature of between −60° C. and −10° C.

6. The process according to claim 1, further comprising the step of separating the dried compressed stream in the permeation unit, the permeate forming the regeneration gas and the non-permeate forming the stream derived from the dried compressed stream of step iii).

7. The process according to claim 1, further comprising the step of vaporizing the liquid enriched in carbon dioxide to produce refrigeration to cool the dried compressed stream or the non-permeate derived therefrom.

8. The process according to claim 1, further comprising the step of sending the regeneration gas from the adsorption unit to the compressor downstream of at least one stage of the compressor.

9. The process according to claim 1, further comprising the step of further compressing the dried compressed stream prior to the permeation step.

10. A process for the separation of a stream containing carbon dioxide, water and at least one light impurity including a separation step at sub-ambient temperature, the process comprising the steps of:
vi. purifying a feed stream in an adsorption unit to remove water and form a dried compressed stream;
vii. cooling the dried compressed stream or a stream derived therefrom to a sub-ambient temperature and separating by partial condensation and/or distillation in a separation apparatus;
viii. removing a liquid enriched in carbon dioxide from the separation apparatus; and
ix. regenerating the adsorption unit using a regeneration gas;
x. wherein the regeneration gas is formed by separating, by permeation in a permeation unit, the dried compressed stream or a gas derived therefrom, the permeate of the permeation unit constituting the regeneration gas,
wherein the stream containing carbon dioxide, water and at least one light impurity is compressed in a compressor comprising at least two stages to form the feed stream and the feed stream contains at least 65 mol. % carbon dioxide,
wherein the feed stream is comprised of a flue gas stream from an oxycombustion unit.

11. The process according to claim 10, wherein the process further comprises the steps of:
withdrawing a top gas from a phase separator of the separation apparatus and separating the top gas in the permeation unit to form the regeneration gas: and
withdrawing a retentate from the permeation unit and then warming said retentate.

12. The process according to claim 11, wherein the permeation unit has an entry temperature of between −60° C. and −10° C.

13. The process according to claim 11, further comprising the steps of separating the non-permeate of the permeation unit in a further permeation unit; and sending the permeate of the further permeation unit upstream of a stage of the compressor.

14. The process according to claim 13, wherein the further permeation unit has an entry temperature of between −60° C. and −10° C.

15. The process according to claim 10, further comprising the step of separating the dried compressed stream in the permeation unit, the permeate forming the regeneration gas and the non-permeate forming the stream derived from the dried compressed stream of step iii).

16. The process according to claim 10, further comprising the step of vaporizing the liquid enriched in carbon dioxide to produce refrigeration to cool the dried compressed stream or the non-permeate derived therefrom.

17. The process according to claim 10, further comprising the step of sending the regeneration gas from the adsorption unit to the compressor downstream of at least one stage of the compressor.

18. The process according to claim 10, further comprising the step of further compressing the dried compressed stream prior to the permeation step.

* * * * *